(12) United States Patent
Yoshioka et al.

(10) Patent No.: US 9,272,354 B2
(45) Date of Patent: Mar. 1, 2016

(54) CYLINDER DEVICE

(75) Inventors: Isao Yoshioka, Yokohama (JP); Norihisa Kimura, Yamato (JP); Kazuyoshi Kambe, Ebina (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 697 days.

(21) Appl. No.: 13/636,996

(22) PCT Filed: Mar. 28, 2011

(86) PCT No.: PCT/JP2011/057635
§ 371 (c)(1),
(2), (4) Date: Sep. 24, 2012

(87) PCT Pub. No.: WO2011/135955
PCT Pub. Date: Nov. 3, 2011

(65) Prior Publication Data
US 2013/0008305 A1 Jan. 10, 2013

(30) Foreign Application Priority Data

Apr. 28, 2010 (JP) ................................ P2010-103760

(51) Int. Cl.
*F01B 11/02* (2006.01)
*B23K 9/028* (2006.01)
*F15B 15/14* (2006.01)
*B23K 33/00* (2006.01)

(52) U.S. Cl.
CPC ............. *B23K 9/0282* (2013.01); *B23K 33/006* (2013.01); *F15B 15/1433* (2013.01); *B23K 2201/006* (2013.01); *B23K 2201/06* (2013.01)

(58) Field of Classification Search
CPC .. B23K 33/00; B23K 33/006; F15B 15/1428; F15B 15/1433

USPC ........................................................ 92/169.1
See application file for complete search history.

(56) References Cited

U.S. PATENT DOCUMENTS 5,372,529 A * 12/1994 Binversie et al. ............ 440/61 R
6,196,112 B1 * 3/2001 Buter ............................ 92/169.1

FOREIGN PATENT DOCUMENTS

JP 58-181493 10/1983
JP 62-126684 8/1987

(Continued)

OTHER PUBLICATIONS

International Search Report issued in PCT/JP2011/057635 on May 17, 2011.

*Primary Examiner* — Edward Look
*Assistant Examiner* — Daniel Collins
(74) *Attorney, Agent, or Firm* — Nixon & Vanderhye P.C.

(57) ABSTRACT

The present invention relates to the provision of a cylinder apparatus that is able to maintain a superior join condition, and has: a cylindrical cylinder (11); an end portion member (12) that is placed on the end portion side of the cylinder (11); and a weld portion (13) that fixes an outer circumferential side of the cylinder (11), when this has been engaged with an inner circumferential side of the end portion member (12), to one end of the end portion member (12) by means of a weld, wherein abutting portions (21), which abut in the circumferential direction against a contact portion (60) of the end portion member (12) and notch portions (20) are provided alternatingly in the circumferential direction on the end portion side of the cylinder (11), and the notch portions (20) form communicating passages (69) that connect the weld portion (13) to an inner circumferential side space (67) inside the cylinder (11) or end portion member (12).

20 Claims, 8 Drawing Sheets

(56) References Cited

FOREIGN PATENT DOCUMENTS

| JP | 62-140206 | 9/1987 |
| JP | 06-304751 | 11/1994 |
| JP | 2009-191765 | 8/2009 |
| JP | 2009-287752 | 12/2009 |

* cited by examiner

CYLINDER DEVICE

CROSS-REFERENCE TO RELATED APPLICATIONS

This Application is a national phase of PCT Application No. PCT/JP2011/057635 filed Mar. 28, 2011, which claims the benefit of Japanese Patent Application No. 2010-103760, filed Apr. 28, 2010, the contents of all of which are herein incorporated by reference.

FIELD OF THE INVENTION

The present invention relates to a cylinder apparatus.
Priority is claimed on Japanese Patent Application No. 2010-103760, filed Apr. 28, 2010, the contents of which are incorporated herein by reference.

BACKGROUND ART

One type of cylinder apparatus is a cylinder apparatus that is formed by welding an end portion member to a cylindrical outer cylinder (see, for example, Patent document 1).

PRIOR ART DOCUMENT

Patent Literature

[Patent Document 1] Japanese Unexamined Patent Application, First Publication No. 2009-287752

SUMMARY OF THE INVENTION

Problems to be Solved by the Invention

If blowholes are generated during welding in a weld portion, then there is a possibility that it may not be possible to maintain a superior join condition.

Accordingly, it is an object of the present invention to provide a cylinder apparatus that makes it possible to maintain a superior join condition.

Means for Solving the Problem

In order to achieve the aforementioned object, the present invention is a cylinder apparatus that includes: a cylindrical outer cylinder; an end portion member that is engaged with the end portion side of the outer cylinder; and a weld portion that fixes the end portion member to the outer cylinder by welding around an entire circumference of an engagement portion between the end portion member and the outer cylinder, wherein abutting portions and notch portions are provided alternatingly on at least one of the outer cylinder and the engagement portion of the end portion member, and abut in the circumferential direction against the other one of the outer cylinder and the engagement portion of the end portion member, and the notch portions form communicating passages that connect the weld portion to an internal space inside the outer cylinder.

Effects of the Invention

According to the present invention it is possible to maintain a superior join condition.

DESCRIPTION OF EMBODIMENTS

A cylinder apparatus according to a first embodiment of the present invention will now be described with reference made to the drawings.

Figure 1:
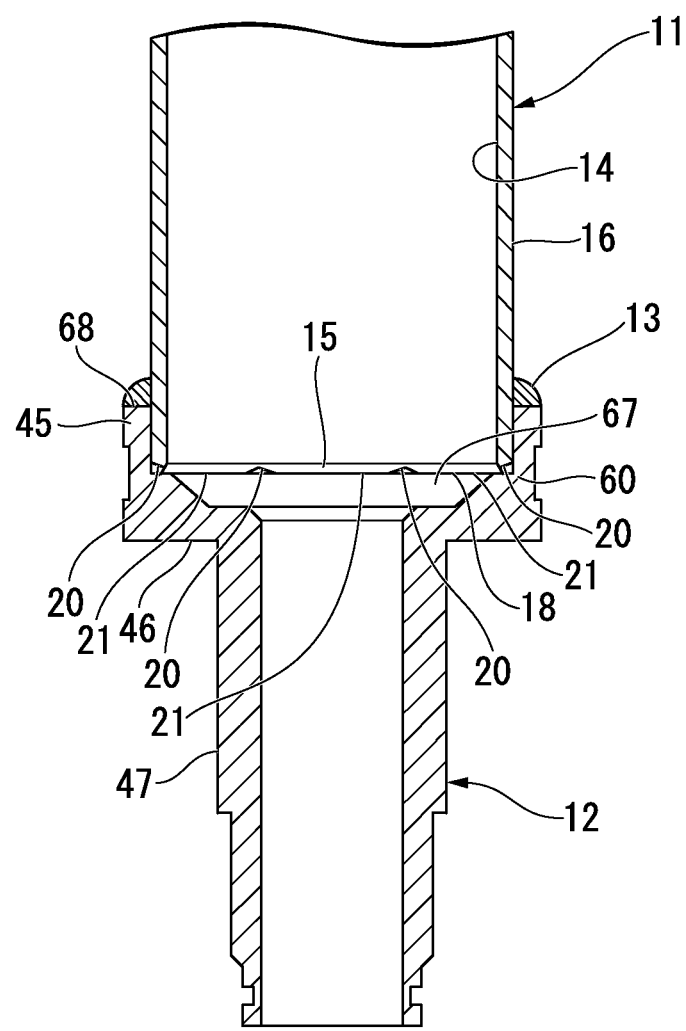
FIG. 1 is a side cross-sectional view showing a cylinder apparatus according to a first embodiment of the present invention.

The cylinder apparatus according to the first embodiment is, for example, a hydraulic shock absorber and, as is shown in FIG. 1, has a cylinder 11 that serves as a cylindrical metal outer cylinder, a metal cap 12 that serves as an end portion member that is placed on an end portion side of the cylinder 11, and a weld portion 13 that is arc-welded around the entire periphery of the cylinder 11 and cap 12. This cylinder 11 is effective from the viewpoint of cost as it is formed by cutting a pipe material such as a solid-drawn steel pipe, or a welded steel pipe or the like. The metal cap is manufactured by performing cutting processing on a bar or pipe.

Figure 2A:
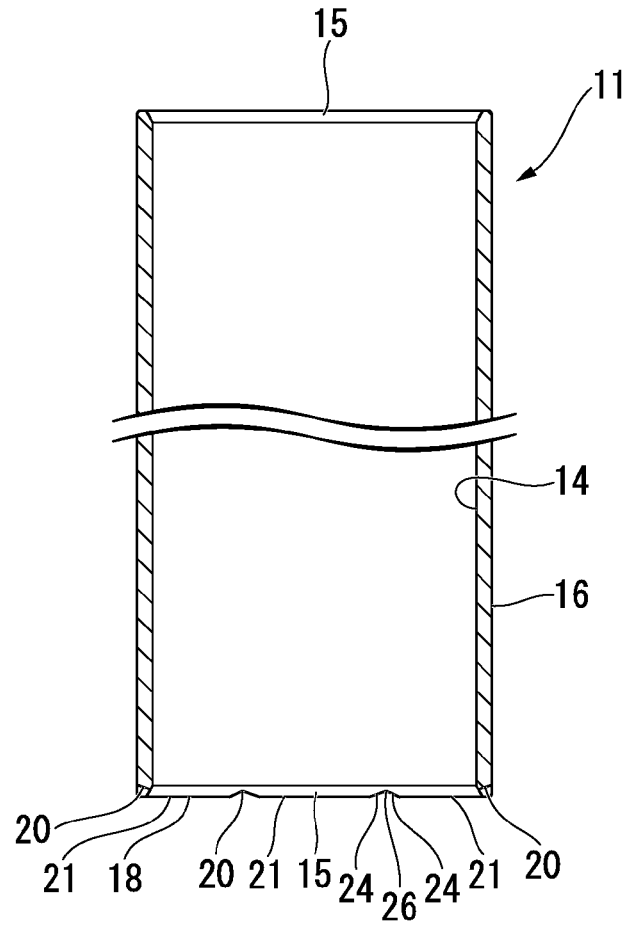
FIG. 2A is a side cross-sectional view of a cylinder in the cylinder apparatus according to the first embodiment of the present invention.
Figure 2B:
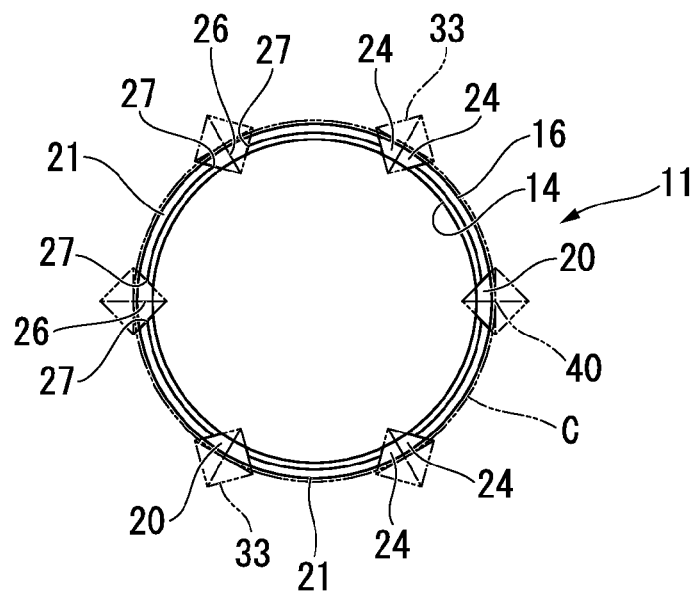
FIG. 2B is a bottom view of a cylinder in the cylinder apparatus according to the first embodiment of the present invention.

As is shown in FIGS. 2A and 2B, the shape of the cylinder 11 is such that an inner circumferential surface 14 thereof has a chamfered portion 15 that is formed by chamfering the entire periphery of the inner circumferential side of the end portion, and an outer circumferential surface 16 of the cylinder 11 has a constant diameter.

Notch portions 20 that are formed by making depressions in an end surface 18 on the cap 12 side (i.e., the bottom side in FIG. 2A) of the cylinder 11 in an axial direction are formed equidistantly in a plurality of locations (specifically, six locations) in the circumferential direction of the cylinder 11. Abutting portions 21 that form the end surface 18 are provided respectively between adjacent notch portions 20 of the notch portions 20 that have been placed equidistantly in the circumferential direction of the cylinder 11 in this manner. As a result, the notch portions 20 and the abutting portions 21 are provided alternatingly in the circumferential direction on the end portion on the cap 12 side of the cylinder 11.

The notch portions 20 are formed by pairs of flat faces 24 that are mutually continuous in the circumferential direction of the cylinder 11. Each pair of flat faces 24 is formed such that, at the outer circumferential surface 16 of the cylinder 11, boundary lines 26 between the pairs of flat faces 24 are in the furthest position in the axial direction of the cylinder 11 from the end surface 18, and the pairs of flat faces 24 are symmetrically inclined such that both sides thereof in the circumferential direction gradually approach the end surface 18. Accordingly, the notch portions 20 are formed in a V-shape when viewed from a radial direction, with a central position thereof in the circumferential direction of the cylinder 11 being depressed the most.

Moreover, in the notch portions 20, the boundary lines 26 between adjacent pairs of flat faces 24 are also inclined such that the inner sides thereof in the radial direction of the cylinder 11 are closer than the outer sides thereof in the radial direction to the end surface 18 in the axial direction of the cylinder 11. In the notch portions 20, boundary lines 27 between each flat face 24 and the end surface 18 are also inclined in the circumferential direction of the cylinder 11 such that the inner radial side is closer to the center boundary line 26 than the outer radial side.

Figure 3A:
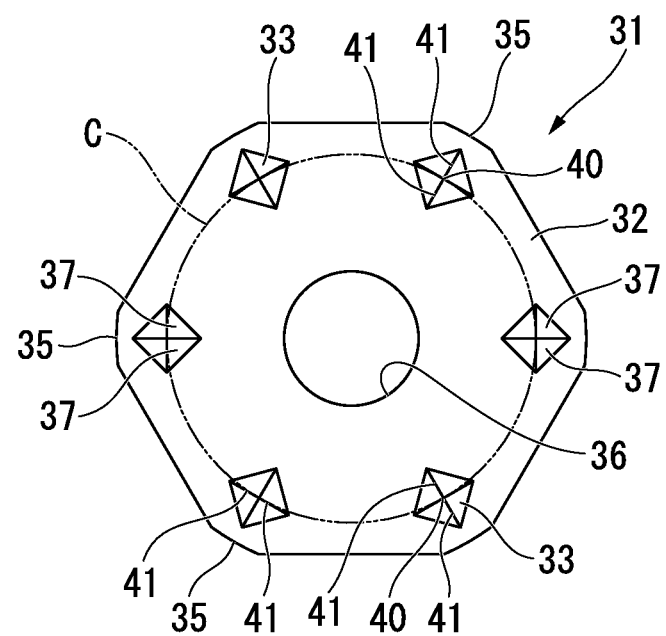
FIG. 3A is a plan view of a crimping tool for the cylinder apparatus according to the first embodiment of the present invention.
Figure 3B:
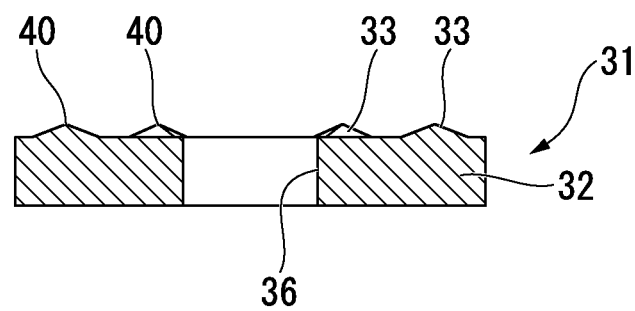
FIG. 3B is a side cross-sectional view of a crimping tool for the cylinder apparatus according to the first embodiment of the present invention.

The plurality of notch portions 20 are formed by press-working using a crimping tool 31, which is shown in FIGS. 3A and 3B. The crimping tool 31 has a planar base plate portion 32, and square pyramid-shaped crimping projections 33 that protrude in the plate thickness direction from a surface on one side in the plate thickness direction of the base plate portion 32 in a plurality of locations (specifically, six positions).

As is shown in FIG. 3A, when viewed in the plate thickness direction, the base plate portion 32 is shaped as a regular hexagon in which chamfers 35 are formed equally on all of the angle portions. Moreover, hole portions 36 that penetrate in the plate thickness direction are formed in the center of the base plate portion 32.

The plurality of crimping projections 33 have identical isosceles triangle-shaped flat surfaces 37 in four locations, and are formed on the base plate portion 32 at equal intervals in the circumferential direction on a uniform placement circle C, which is centered on the center line of the base plate portion 32, such that apexes 40 of each crimping projection 33 are placed on this placement circle C. The apexes 40 of each one of the plurality of crimping projections 33 are placed on a line that connects the center line of the base plate portion 32 with the center in the circumferential direction of the chamfers 35. Accordingly, the phases of the chamfers 35 and the crimping projections 33 in the circumferential direction of the crimping tool 31 match each other. Moreover, each one of the plurality of crimping projections 33 is formed on the base plate portion 32 at such an angle that ridge lines 41 thereof are located in two positions 180 degrees opposite each other on a line that connects together the center line of the base plate portion 32 with the center in the circumferential direction of the chamfers 35. As is shown in FIG. 2B, the diameter of the aforementioned placement circle C is larger than the outer diameter of the cylinder 11, namely, larger than the diameter of the outer circumferential surface 16.

Once the center of the crimping tool 31 and the center of the cylinder 11 have been matched with each other, by then pressing the crimping tool 31 in the axial direction relative to the cylinder 11 until the base plate portion 32 abuts against the end surface 18, the above-described plurality of crimping projections 33 are made to bite into the cylinder 11 a predetermined depth from the end surface 18. As a result of this, the above-described plurality of notch portions 20 are formed in an end portion in the axial direction of the cylinder 11. In the plastic deformation generated by this crimping, the crimping projections 33 initially bite into the outer diametric side of the end surface 18 of the cylinder 11, and then gradually broaden their bite onto the inner diametric side. Because of this, the notch portions 20 are formed at the same time as the excess thickness generated by the plastic deformation is being moved onto the inner circumferential side of the cylinder 11.

As is shown in FIG. 1, the cap 12 has an overall cylindrical shape, and has a substantially circular cylinder-shaped engaging portion 45 inside which the cylinder 11 is fitted, a step portion 46 that protrudes inwards in the radial direction from one side in the axial direction of the engaging portion 45, and a substantially circular cylinder-shaped cylindrical portion 47 that has a smaller diameter than that of the engaging portion 45 and that extends from the center of the step portion 46 on the opposite side from the engaging portion 45. The thickness of this engaging portion 45 is thicker than that of the cylinder 11, and the engaging portion 45 is more rigid than the cylinder 11.

Figure 4:
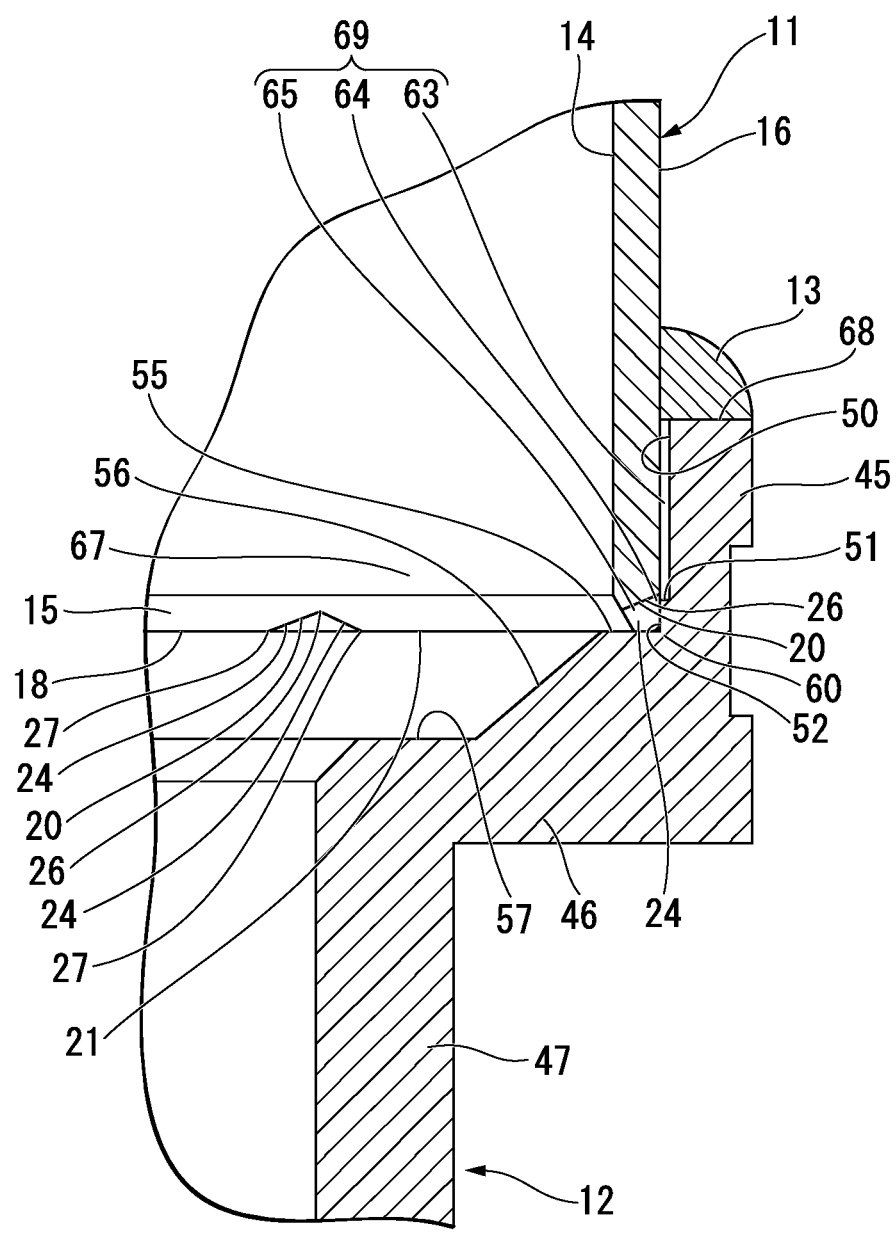
FIG. 4 is a partially expanded cross-sectional view showing principal portions of the cylinder apparatus according to the first embodiment of the present invention.

As is shown in FIG. 4, on the inner circumferential side of the engaging portion 45 are formed, in the following sequence starting from the opposite side from the cylindrical portion 47, an insertion inner circumferential surface 50 that has a slightly larger diameter than the outer circumferential surface 16 of the cylinder 11 so as to serve as an enlarged diameter portion of the engaging portion 45 extending in the axial direction thereof, a toroidal step surface 51 that extends inwards in a radial direction from an edge portion of the insertion circumferential surface 50 which is on the cylindrical portion 47 side thereof, and a press-insertion inner circumferential surface 52 that is sufficiently smaller than the outer circumferential surface 16 of the cylinder 11 to allow the press-insertion of the cylinder 11 so as to serve as a small diameter portion of the engaging portion 45 extending in the axial direction thereof. The insertion inner circumferential surface 50 and the press-insertion inner circumferential surface 52 have the same center line.

If the cylinder 11 and the cap 12 can be positioned in the radial direction within the permitted design margin, then they may be fitted together using only this permitted design margin without the cylinder 11 needing to be press-inserted inside the press-insertion inner circumferential surface 52.

In the step portion 46 are formed a toroidal strike surface 55 that extends inwards in a radial direction from the edge portion of the press-insertion inner circumferential surface 52 that is on the opposite side from the insertion inner circumferential surface 50, a tapered surface 56 that tapers inwards from an inner circumferential edge of the strike surface 55 which is on the opposite side from the engaging portion 45, and a toroidal flat surface 57 that extends inwards in a radial direction from an inner circumferential edge of the tapered surface 56 in the engaging portion 45.

The cylinder 11 is press-inserted inside the press-insertion inner circumferential surface 52 of the cap 12 by overcoming the jamming resistance generated at the outer circumferential surface 16 of the cylinder 11. The cylinder 11 is then press-inserted until the end surface 18 thereof strikes against the strike surface 55 of the cap 12. In the cap 12, a boundary portion between the engaging portion 45 and the step portion 46 including, on the inner circumferential side, the press-insertion inner circumferential surface 52 and the strike surface 55 forms a contact portion 60 that is in contact with the end portion of the cylinder 11. In addition, the abutting portions 21 between the notch portions 20 at the end portion of the cylinder 11 are in contact with the contact portion 60 via the portions thereof that form the outer circumferential surface 16 and the end surface 18. Once the cylinder 11 has been press-inserted as was described above, the outer circumferential surface 16 thereof forms a circular cylinder-shaped space 63 between itself and the insertion inner circumferential surface 50 of the cap 12.

Here, the distance from the end surface 18 to the end portion on the outer circumferential surface 16 side of the boundary line 26 that is formed between the deepest pair of flat surfaces 24 of the notch portions 20 in the cylinder 11 is longer than the distance in the axial direction of the press-insertion inner circumferential surface 52, namely, is longer than the distance between the step surface 51 and the strike surface 55. Accordingly, as is described above, when the end surface 18 of the cylinder 11 has collided against the striking surface 55 of the cap 12, a portion of the notch portion 20 which is on the outer circumferential surface 16 of the cylinder 11 side thereof is located closer to the insertion inner circumferential surface 50 side in the axial direction of the cylinder 11 than is the step surface 51. Accordingly, the insertion inner circumferential surface 50 of the cap 12 and the notch portions 20 of the cylinder 11 overlap in the axial direction. Because of this, aperture portions 64 that open onto the aforementioned space 63 are formed by the step surface 51 and a portion of the notch portions 20. As a result, the space 63 is connected via the aperture portions 64 to a space 65 that is formed between the notch portions 20 and the striking surface 55. The space 63, aperture portions 64, and space 65 form an inner circumferential side space 67 and communicating passages 69 of the cylinder 11 and the cap 12. The communicating passages 69 are communicating passages that connect to the outside from between the outer circumferential surface 16 of the cylinder 11 and an end surface 68 of the engaging portion 45 of the cap 12 which on the opposite side thereof from the cylindrical portion 47.

The cap 12 and the cylinder 11 are then further welded in this press-insertion state. As a result of this welding, the weld portion 13 that is tightly welded to the outer circumferential surface 16 of the cylinder 11 and the end surface 68 of the cap 12 is formed. This weld portion 13 is formed around the entire circumference of the cylinder 11 and cap 12. In other words, the weld portion 13 fixes the outer circumferential side of the cylinder 11, which is engaged with the inner circumferential side of the cap 12, with one end of the cap 12 by means of arc-welding. At this time, since the above-described communicating passages 69 connect the weld portion 13 to the inner circumferential side space 67 of the cylinder 11 and cap 12, any gas generated on the weld portion 13 side during welding and any expanded air (i.e., gas) in the space 63 is able to use the communicating passages 69 as an escape route and be discharged onto the inner circumferential side space 67 of the cylinder 11 and cap 12. Each communicating passage 69 is provided with a first communicating passage and a second communicating passage. The first communicating passages connect one end of the notch portions 20 to the weld portion 13, and form the space 63 between the outer circumferential surface 16 of the cylinder 11 and the insertion inner circumferential surface 50 of the cap 12. The second communicating passages form the space 65 between the notch portions 20 and the striking surface 55, and connect the first communicating passages to the inner circumferential side space 67 in the cylinder 11 and the cap 12.

In the above-described cylinder apparatus, a piston (not shown) is slidably fitted inside the cylinder 11. As a result of the piston being fitted in this manner, a piston rod (not shown), which is fixed to one end of the piston, extends to the outside from the end portion of the cylinder 11 on the opposite side thereof from the cap 12. The piston rod can be made to move in and out by connecting a tube to the cylindrical portion 47 and then alternately supplying and expelling a gas or liquid thereto from an external pump.

According to the above-described first embodiment, by providing the notch portions 20 alternatingly with the abutting portions 21 that come into contact with the contact portion 60 of the cap 12 in the circumferential direction of the end portion of the cylinder 11, the notch portions 20 form communicating passages 69 that connect the weld portion 13 to the inner circumferential side space 67 of the cylinder 11 and the cap 12. Because of this, any gas generated on the weld portion 13 side during welding is discharged via the communicating passages 69 to the inner circumferential side space 67 in the cylinder 11 and cap 12. Accordingly, even if no gas venting time is provided during welding, it is possible to suppress the generation of blowholes. As a result, high-speed arc welding becomes possible, and not only is there an improvement in production efficiency, but it is also possible to maintain a superior weld condition.

Moreover, since the end portion of the cylinder 11 is fitted inside the inner circumferential side of the engaging portion 45 of the cap 12, the compressive strength of the cylinder 11 can be improved particularly when the cylinder apparatus is a pressurized container.

Moreover, since the notch portions 20 are formed by plastic deformation, no shaving dust is generated from cutting. As a consequence, it is easy to avoid problems such as contamination. Moreover, since a plurality of the notch portions 20 can be worked simultaneously, productivity is excellent. It is also possible for the notch portions 20 to be formed via a cutting process, however, in that case, it is necessary to wash the components to ensure that no shaving dust remains behind.

Moreover, since the material of the cylinder 11 is pushed towards the inner circumferential side of the cylinder 11 during the plastic deformation of the notch portions 20, the engagement of the cap 12 with the cylinder 11 is not obstructed by any leftover material, and it is not necessary for such leftover material to be removed. Accordingly, it is possible to both reduce production costs and avoid the problem of contamination and the like that might be caused by having to remove such leftover material. Furthermore, since the configuration that enables the material to be pushed towards the inner circumferential side of the cylinder 11 is achieved by appropriately devising the configuration of the crimping tool 31, productivity can be improved.

Since the notch portions 20 are placed at equal intervals in the circumferential direction, the abutting portions 21 are also located at equal intervals in the circumferential direction, and this enables the pressure balance to be evenly maintained during the press-insertion. Accordingly, the abutting portions 21 can be easily press-inserted inside the press-insertion inner circumferential surface 52 of the cap 12.

Moreover, in the present embodiment, a configuration in which the chamfers 15 are provided on the end portion of the cylinder 11 is employed, however, it is not essential for the chamfers 15 to be provided. Nevertheless, if the chamfers 15 are formed, then since the chamfers 15 can be plastically deformed by means of pressing, it is possible to limit the pressing force needed when the notch portions 20 are being formed in the cylinder 11, and a reduction in the size of the working apparatus can be achieved.

In the first embodiment, a structure is employed in which the abutting portions 21 on the end portion of the cylinder 11 collide against the strike surface 55 as they are being press-inserted inside the press-insertion inner circumferential surface 52 on the inner circumferential side of the cap 12, however, it is also possible for them to only be press-inserted inside the press-insertion inner circumferential surface 52 without colliding against the strike surface 55, or to collide against the strike surface 55 without being press-inserted inside the press-insertion inner circumferential surface 52.

Moreover, if the aperture portions 64 of notch portions 20 are extended as far as the weld portion 13, and the cylinder 11 and cap 12 are then fitted loosely together, then it is possible for only the insertion inner circumferential surface 50 to be provided and for the press-insertion inner circumferential surface 52 to be omitted.

Furthermore, it is also possible for the notch portions 20 to be provided in the strike surface 55 instead of in the end portion of the cylinder 11.

A second embodiment will now be described with reference made to FIG. 5A through FIG. 8B.

Figure 5A:
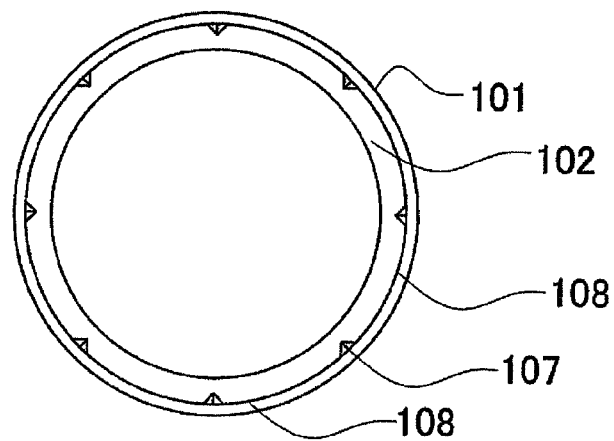
FIG. 5A is a top view of a cylinder apparatus according to a second embodiment of the present invention.
Figure 5B:
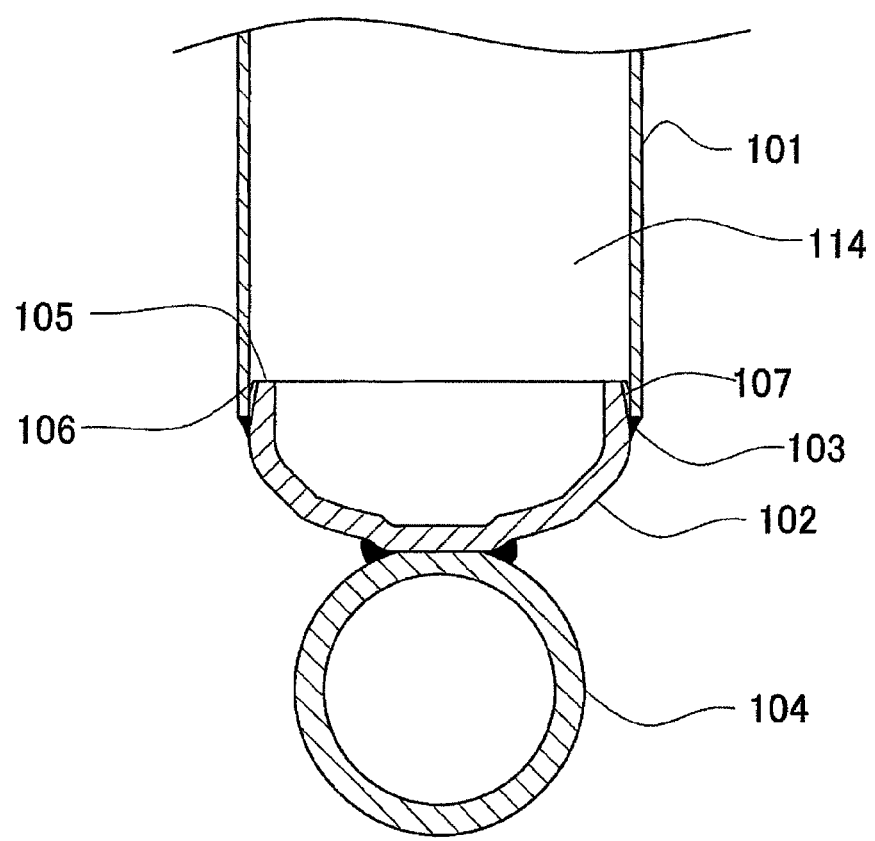
FIG. 5B is a side cross-sectional view of the cylinder apparatus according to the second embodiment of the present invention.

A cylinder apparatus according to the second embodiment is, for example, a shock absorber for a vehicle. In FIGS. 5A and 5B, a bottom end portion thereof is shown. This shock absorber has a cylindrical metal cylinder 101, a metal cap 102 that serves as an end component that is placed at an end portion of the cylinder 101, and a weld portion 103 that is formed by arc-welding the cylinder 101 and cap 102 together. A toroidal ring 104 that is used for mounting on a vehicle or the like is attached by welding to a bottom end of the cap 102.

Hydraulic fluid is sealed inside the cylinder 101. A piston (not shown) in which a damping valve that generates damping force is provided is slidably fitted inside this cylinder 101. One end of a piston rod (not shown) is connected to this piston. The other end of the piston rod penetrates a rod guide (not shown) and a seal (not shown) from the opposite side of the cylinder 101 from the cap 102, and extends to the outside. In addition, a free piston is placed between the piston and the cap 102, and a high-pressure gas chamber of approximately 30 atmospheres is formed between the free piston and the cap 102. Together, these components form a mono-tube shock absorber.

The cylinder 101 is a tubular body. This tubular body is effective from the viewpoint of cost as it is formed by cutting a pipe material such as a solid-drawn steel pipe, or a welded steel pipe or the like. It is also possible for a pipe in which only the end portion has either been enlarged or contracted in diameter, or in which the central portion thereof has undergone deformation processing to be used as the cylinder 101.

The metal cap 102 is manufactured by press-working.

A constricted portion 106 where the diameter of the cap 102 is constricted is provided on an end surface 105 on the cylinder 101 side (i.e., on the top side in FIG. 5B) of the cap 102, and this shape enables the cap 102 to be easily inserted inside the cylinder 101.

Notch portions 107, which are hollowed out in a V shape, are formed equidistantly in a circumferential direction in a plurality of locations (specifically, in eight locations) around the outer circumference on the end surface 105 side of the cap 102, and the apex point of the V-shape of each notch portion 107 faces in the inner circumferential direction. The outer circumferential surfaces between adjacent notch portions 107, which are placed equidistantly in the circumferential direction of the cap 102 in this manner, form abutting portions 108 that abut against the inner circumferential surface of the cylinder 101.

Accordingly, in the portion where the cylinder 101 and the cap 102 are mutually engaged with each other, the abutting portions 108 and the notch portions 107 (i.e., non-abutting portions) are formed alternatingly in the circumferential direction.

Figure 6:
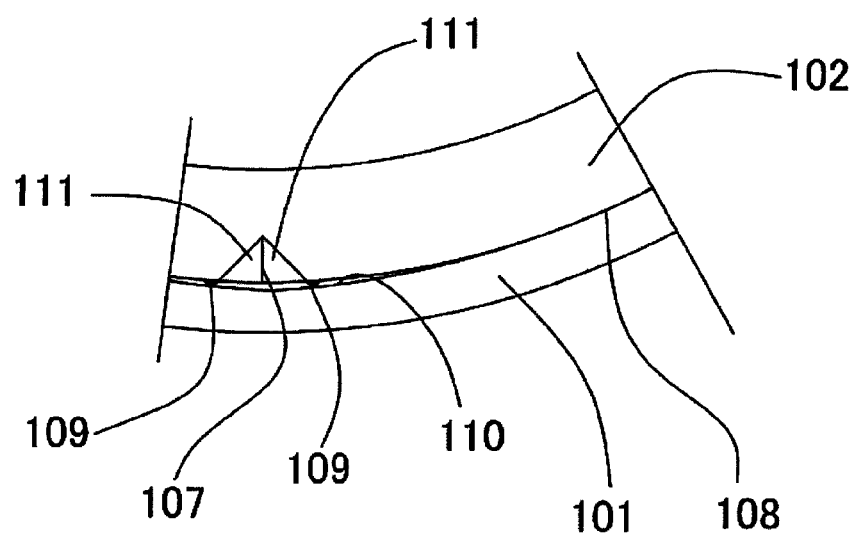
FIG. 6 is a partially expanded view of FIG. 5A.

As is shown in FIG. 6, when the notch portions 107 are being formed by a crimping operation, bulge portions 109 where the material in these portions is made to bulge outwards in a radial direction are formed on both sides in the circumferential direction of the notch portions 107. As a result, when the cap 102 is fitted together with the cylinder 101, since the rigidity of the cap 102 is higher than that of the cylinder 101, the cylinder 101 is slightly deformed and non-abutting portions 110 are also formed on the opposite side from the notch portions 107 in the circumferential direction of the bulge portions 109. Accordingly, both ends in the circumferential direction of the abutting portions 108 are formed as slight non-abutting portions 110.

It is also possible to not generate the non-abutting portions 110 by selecting suitable rigidities for the cylinder 101 and the cap 102, or by selecting a suitable working method when the notch portions 107 are being formed.

Each notch portion 107 is formed by a pair of triangular flat surfaces 111 that are continuous with each other in the circumferential direction of the cap 102, and is inclined so as to become gradually shallower as it moves away in the axial direction from the end surface 105. Accordingly, the notch portions 107 form V shapes when viewed from both the radial direction and the axial direction.

The notch portions 107 do not have to extend as far as the end surface 105.

Next, a method and apparatus for manufacturing the above-described cylinder apparatus will be described.

Figure 7:
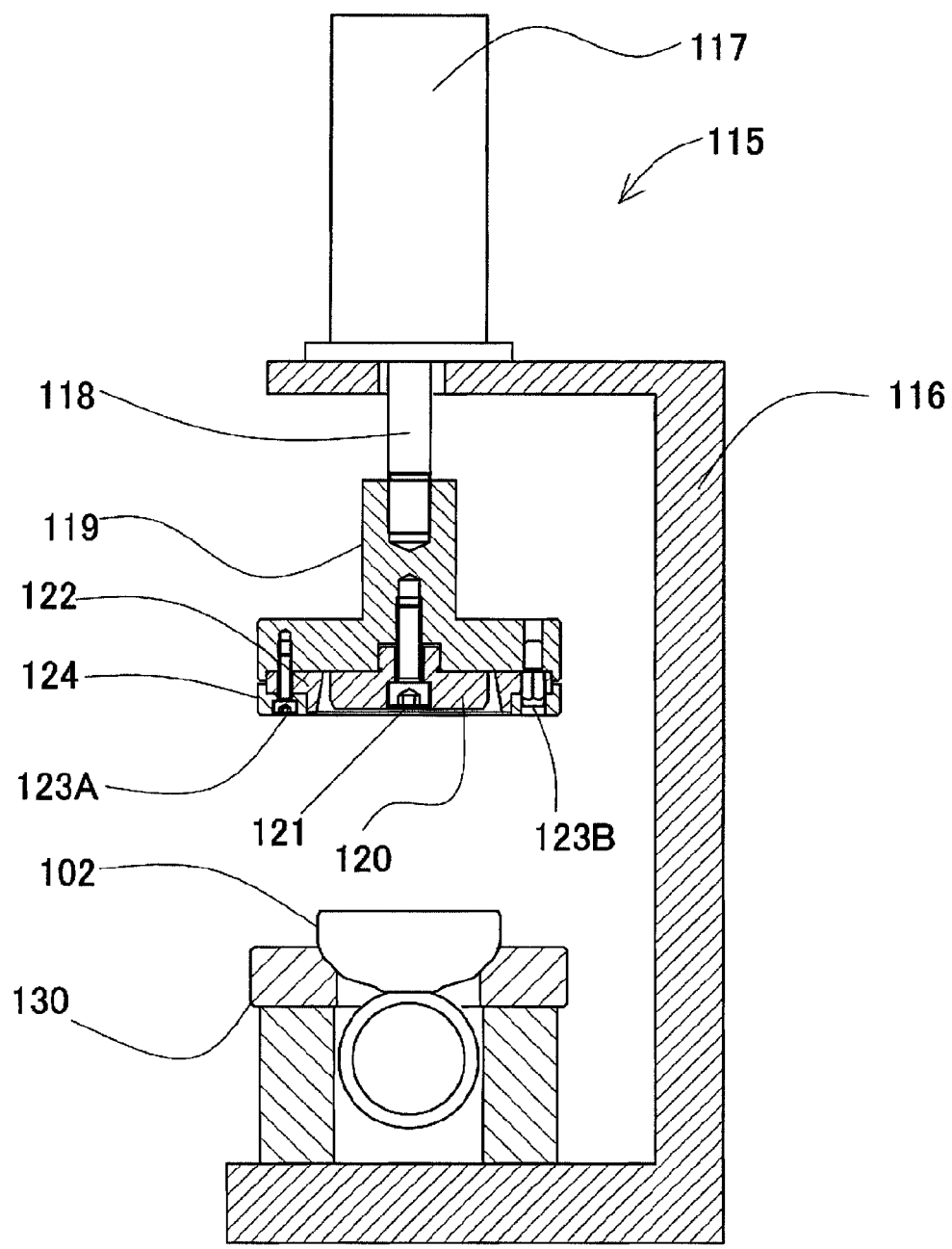
FIG. 7 is a side cross-sectional view of a crimping apparatus for the cylinder apparatus according to the second embodiment of the present invention.

Firstly, the cap 102 is formed by press-working. The ring 104 is then welded onto the bottom end thereof. Next, a crimping apparatus 115, which is shown in FIG. 7, is used in a step to mold the plurality of notch portions 107.

The crimping apparatus 115 is a general purpose press apparatus in which a cylinder apparatus 117 is provided on a top portion of a base 116.

A mounting component 119 is fixed to the distal end of a rod 118 of the cylinder apparatus 117. A guide portion 120 that is circular and guides the inner circumferential portion of the cap 102 is fixed by a bolt 121 to the bottom surface of the mounting component 119. Moreover, a toroidal working jig 122 is mounted on the outer periphery of the guide portion 120 by fixing a toroidal holding component 124 using bolts 123A. The symbol 123B indicates a positioning pin.

Figure 8A:
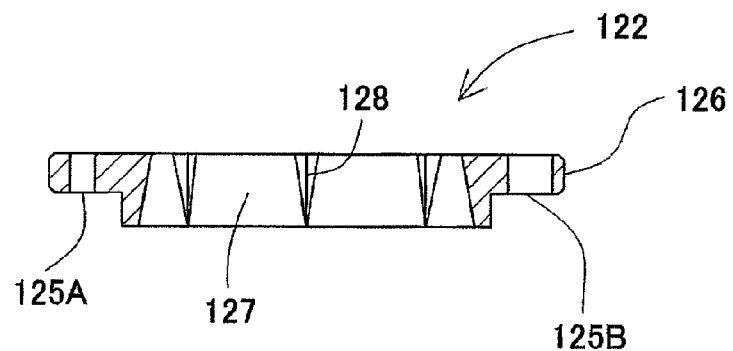
FIG. 8A is a side cross-sectional view of the crimping tool for the crimping apparatus shown in FIG. 7.
Figure 8B:
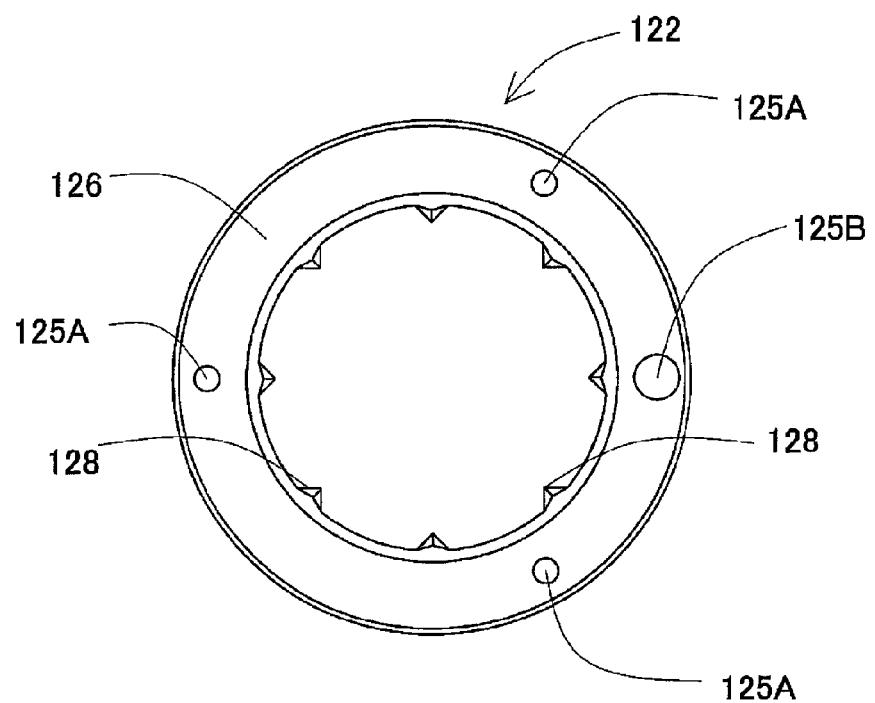
FIG. 8B is a bottom view of the crimping tool for the crimping apparatus shown in FIG. 7.

As is shown in FIGS. 8A and 8B, bolt holes 125A through which the bolts 123A are inserted around the toroidal working jig 122 and a flange portion 126 in which a pin hole 125B through which the bolts 123A is inserted is provided, are formed in the toroidal working jig 122. Working projections 128 are formed equidistantly in the circumferential direction in eight locations in an inner circumferential surface 127.

A die 130 on which the cap 120 is placed is provided vertically underneath the mounting component 119.

In this crimping apparatus 115, once the cap 102 has been placed on the die 120, the working jig 122 is moved downwards by the cylinder apparatus 117 so as to form the notch portions 107 in the cap 102. The distance that the working jig 122 moves in a downward direction may be controlled using the stroke of the cylinder apparatus 117, or it may be controlled by detecting when the top end surface of the die 130 comes into contact with the working jig 122.

The cap 102, which has been worked in this manner, is then press-inserted inside the cylinder 101, and arc-welding is then performed around the entire periphery of the end portion of the cylinder 101. As a result, a cylinder assembly is manufactured.

Thereafter, internal parts such as a piston and the like are inserted, and a rod guide and the like are attached to the aperture of the cylinder 101 resulting in a cylinder apparatus being manufactured.

According to the above-described second embodiment, by providing the abutting portions 108, which abut against the cylinder 101, and the notch portions 107 alternatingly in the circumferential direction on the end portion of the cap 102, the notch portions 107 form communicating passages that connect together the weld portions 103 and an inner circumferential space 114 inside the cylinder 101 and the cap 102. As a result, even if any gas that is generated on the weld portion 103 side during welding, namely, any gas that is emitted by the molten metal, or any tiny amounts of gas remaining in the press-insertion portions of the cylinder 101 and cap 102 become expanded by the heat from the welding, this gas is able to escape via the notch portions 107 to the inner circumferential space 114. Accordingly, even if no gas venting time is provided during welding, it is possible to suppress the generation of blowholes. As a result, high-speed arc welding becomes possible, and not only is there an improvement in production efficiency, but it is also possible to maintain a superior weld condition.

Moreover, since the notch portions 107 are formed by plastic deformation, no shaving dust is generated from cutting. As a consequence, it is easy to avoid problems such as contamination. It is also possible for the notch portions 107 to be formed via a cutting process, however, in that case, it is necessary to wash the components to ensure that no shaving dust remains behind.

Moreover, as is shown in FIG. 6, when the notch portions 107 are being crimped, the metal material in these portions is pushed outwards in a radial direction, resulting in the formation of the bulge portions 109. In this case, since the non-abutting portions 110 are also formed on the opposite side of the bulge portions 109 from the notch portions 107, the surface area of the communicating passage that communicates with the inner circumferential side space 114 in the cylinder 101 and cap 102 is enlarged.

Since the notch portions 107 are placed are equal intervals in the circumferential direction, the abutting portions 108 are also located at equal intervals in the circumferential direction, and this enables the pressure balance to be evenly maintained during the press-insertion. Accordingly, the abutting portions 108 can be easily press-inserted inside the outer circumference of the cap 102.

Moreover, in the second embodiment, a configuration is employed in which the constricted portion 106 is provided at the end portion of the cap 102, however, it is not essential for the constricted portion 106 to be provided. Nevertheless, if the constricted portion 106 is formed, then since the constricted portion 106 can be elastically deformed by means of pressing, it is possible to limit the pressing force needed when the notch portions 107 are being formed in the cylinder 101, and a reduction in the size of the working apparatus can be achieved.

Furthermore, in the second embodiment, the notch portions 107 are provided in the cap 102, however, it is also possible for them to be provided in the inner circumference of the cylinder 101 instead.

The cylinder apparatus to which the present invention is applied is not limited to the above-described hydraulic shock absorber and mono-tube shock absorber, and the present invention can also be used in cylinder apparatuses such as such as twin-tube hydraulic shock absorbers and the like. In particular, the present invention is effective in a type of cylinder apparatus in which a high-pressure gas acts on the cap portion. For example, the present invention is ideal for hydraulic shock absorbers equipped with a self-leveling function that are used in suspensions, cylinder apparatuses that are used for adjusting the height of a vehicle, and cylinder apparatuses that are used for stabilizers, and the like.

In each of the above-described embodiments, arc-welding is used in the examples, however, the present invention can also be used in other types of gas welding if blow holes are generated in those types of welding.

INDUSTRIAL APPLICABILITY

The cylinder apparatus of the present invention makes it possible to suppress the generation of blow holes even if no gas venting time is provided during welding. As a result, high-speed welding becomes possible, and not only is it possible to improve production efficiency, but it is also possible to maintain a superior join condition.

DESCRIPTION OF THE REFERENCE NUMERALS

11 . . . Cylinder (Outer cylinder), 12 . . . Cap (End portion member), 13 . . . Weld portion, 20 . . . Notch portions, 21 . . . Abutting portions, 60 . . . Contact portions, 67 . . . Inner circumferential side space, 69 . . . Communicating passage

What is claimed is:
1. A cylinder apparatus comprising:
a cylindrical outer cylinder;
an end portion member that is engaged with the end portion side of the outer cylinder; and
a weld portion that fixes the end portion member to the outer cylinder by welding around an entire circumference of an engagement portion between the end portion member and the outer cylinder, wherein
the end portion member has a cylindrical engagement portion, and the outer cylinder is engaged with an inner circumferential side of the engagement portion,
the inner circumferential side of the engagement portion of the end portion member has an enlarged diameter portion at an aperture end side thereof that forms a space between the engagement portion and the outer cylinder, and a reduced diameter portion at a bottom portion side thereof that abuts with an outer circumferential surface of the outer cylinder and that performs positioning of the outer cylinder in a radial direction relative to the end portion, member,
an abutting portion and a notch portion are provided on an end portion of the outer cylinder,
the abutting portion abuts the end portion member, and
the notch portion forms communicating passages that connect the weld portion to an internal space inside the outer cylinder.

2. The cylinder apparatus according to claim 1, wherein the notch portion is formed by plastic deformation while causing the excess thickness generated by the plastic deformation to be moved onto the inner circumferential side of the outer cylinder.

3. The cylinder apparatus according to claim 1, wherein an outer circumferential surface of the outer cylinder is press-inserted into the reduced diameter portion by overcoming the jamming resistance, and a length of the notch portion in an axis direction of the outer cylinder is longer than a length of the reduced diameter portion in the axis direction of the outer cylinder.

4. The cylinder apparatus according to claim 1, wherein a plurality of notch portions and a plurality of abutting portions are formed in a plurality of locations in the circumferential direction of the outer cylinder, and each of the plurality of the notch portions and the plurality of abutting portions are provided alternately in the circumferential direction.

5. The cylinder apparatus according to claim 1, wherein the enlarge diameter portion of the end portion member and the notch portion in the outer cylinder overlap in an axial direction.

6. A cylinder apparatus, comprising:
a cylindrical outer cylinder;
an end portion member that is engaged with the end portion side of the outer cylinder; and
a weld portion that fixes the end portion member to the outer cylinder by welding around an entire circumference of an engagement portion between the end portion member and the outer cylinder, wherein
the end portion member has a cylindrical engagement portion, and the outer cylinder is engaged with an inner circumferential side of the engagement portion,
the engagement portion of the end portion member has an enlarged. diameter portion at an aperture end side thereof that forms a space between the engagement portion and the outer cylinder, and a reduced diameter portion at a bottom portion side thereof that performs positioning in a radial direction relative to the outer cylinder,
an abutting portion and a notch portion are provided on an end portion of the outer cylinder,
the abutting portion abuts the end portion member, and
the notch portion forms communicating passages that connect the weld portion to an internal space inside the outer cylinder together with the space, wherein the end portion member includes a step surface between the enlarged diameter portion and the reduced diameter portion, and a portion of the notch portion is located closer to the enlarged diameter portion in an axial direction of the outer cylinder than the step surface.

7. The cylinder apparatus according to claim 1, wherein the notch portion is formed by a pair of flat faces that are mutually continuous in the circumferential direction of the outer cylinder, and the notch portion is formed in a V-shape when viewed from a radial direction, with a central position thereof in the circumferential direction of the outer cylinder being depressed the most.

8. The cylinder apparatus according to claim 7, wherein in the notch portion, a boundary line between the pair of flat faces is inclined such that an inner side of the outer cylinder in the radial direction of the outer cylinder are closer than an outer side of the outer cylinder in the radial direction to an end surface of the outer cylinder.

9. The cylinder apparatus according to claim 1, wherein the outer cylinder comprises a chamfered portion that is formed by chamfering entire periphery of an inner circumferential side of the end portion of the outer cylinder, and the length of the notch portion at the chamfered portion in the axial direction of the outer cylinder is shorter than the length of the notch portion at the outer sides of the outer cylinder in the axial direction of the outer cylinder.

10. The cylinder apparatus according to claim 1, wherein the end portion member comprises:
a step portion that protrudes inwards in the radial direction from one side in the axial direction of the engagement portion; and
a cylindrical portion that has a smaller diameter than the diameter of the engagement portion and that extends from a center of the step portion on an opposite side from the engagement portion.

11. A cylinder apparatus comprising:
a cylindrical outer cylinder;
an end portion member that is engaged with the end portion side of the outer cylinder; and
a weld portion that fixes the end portion member to the outer cylinder by welding around an entire circumference of an engagement portion between the end portion member and the outer cylinder, wherein
the end portion member has a cylindrical engagement portion, and the end portion member is formed with an insertion inner circumferential surface that has a larger diameter than an outer circumferential surface of the outer cylinder extending in an axial direction of engagement portion, a toroidal step surface that extends inwards in a radial direction from the insertion circumferential surface, a press-insertion inner circumferential surface that is smaller than the outer circumferential surface of the outer cylinder to allow the press-insertion of the outer cylinder extending in the axial direction of the engagement portion, and a toroidal strike surface that extends inwards in the radial direction from the edge portion of the press-insertion inner circumferential surface that is on the opposite side from the insertion inner circumferential surface,
the outer circumferential surface of the outer cylinder forms a space having a circular cylinder-shape between the outer circumferential surface and the insertion inner circumferential surface,
an abutting portion abutting the strike surface and a notch portion are provided on an end portion of the outer cylinder, and
the notch portion forms a communication passage connecting between the weld portion and an inner space of the outer cylinder together with the space.

12. The cylinder apparatus according to claim 11, wherein the outer circumferential surface of the outer cylinder is press-inserted into the press-insertion inner circumferential surface by overcoming the jamming resistance.

13. The cylinder apparatus according to claim 12, wherein the outer cylinder is press-inserted into the press-insertion inner circumferential surface until the abutting portion strikes against the strike surface.

14. The cylinder apparatus according to claim 11, wherein a plurality of the notch portion are formed equidistantly in a plurality of locations in the circumferential direction of the outer cylinder, and the each of the plurality of the notch portion and a plurality of the abutting portions are provided alternately in the circumferential direction.

15. The cylinder apparatus according to claim 11, wherein a portion of the notch portion is located closer to the insertion inner circumferential surface side in the axial direction of the outer cylinder than the step surface.

16. The cylinder apparatus according to claim 15, wherein the insertion inner circumferential surface of the end portion member and the notch portion in the outer cylinder overlap in the axial direction.

17. The cylinder apparatus according to claim 11, wherein the notch portion is formed by a pair of flat faces that are mutually continuous in the circumferential direction of the outer cylinder, and the notch portion is formed in a V-shape when viewed from a radial direction, with a central position thereof in the circumferential direction of the outer cylinder being depressed the most.

18. The cylinder apparatus according to claim 14, wherein in the notch portion, a boundary line between the pair of flat faces is inclined such that inner side of the outer cylinder in the radial direction of the outer cylinder are closer than outer side of the outer cylinder in the radial direction to an end surface of the outer cylinder.

19. The cylinder apparatus according to claim 11, wherein the outer cylinder comprises a chamfered portion that is formed by chamfering entire periphery of an inner circumferential side of the end portion of the outer cylinder, and
the length of the notch portion at the outer sides of the chamfered portion in the axial direction of the outer cylinder is shorter than the length of the notch portion at the outer sides of the outer cylinder in the axial direction of the outer cylinder.

20. The cylinder apparatus according to claim 11, wherein the notch portions are formed by plastic deformation while causing the excess thickness generated by the plastic deformation to be moved onto the inner circumferential side of the outer cylinder.

* * * * *